(12) United States Patent
Shimojo et al.

(10) Patent No.: US 11,994,438 B2
(45) Date of Patent: May 28, 2024

(54) COMMUNICATION DEVICE AND TIRE PRESSURE MONITORING SYSTEM

(71) Applicants: Kabushiki Kaisha Toshiba, Tokyo (JP); Toshiba Electronic Devices & Storage Corporation, Tokyo (JP)

(72) Inventors: Yoshimitsu Shimojo, Kawasaki Kanagawa (JP); Kiichiro Oya, Yokosuka Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 655 days.

(21) Appl. No.: 17/177,792

(22) Filed: Feb. 17, 2021

(65) Prior Publication Data

US 2022/0074804 A1 Mar. 10, 2022

(30) Foreign Application Priority Data

Sep. 9, 2020 (JP) .................................. 2020-151559

(51) Int. Cl.
*G06F 1/32* (2019.01)
*G01L 17/00* (2006.01)
(Continued)

(52) U.S. Cl.
CPC ............ *G01L 17/00* (2013.01); *G06F 1/3275* (2013.01); *G06F 1/3287* (2013.01);
(Continued)

(58) Field of Classification Search
CPC ..... G01L 17/00; G06F 1/3275; G06F 1/3287; G06F 1/3296; G06F 1/3228;
(Continued)

(56) References Cited

U.S. PATENT DOCUMENTS

| 7,131,018 B2 | 10/2006 | Ueda et al. |
| 8,266,954 B2 * | 9/2012 | Toyofuku ............ B60C 23/0457 73/146 |
| 11,433,718 B2 * | 9/2022 | Wang .................. B60C 23/0479 |

FOREIGN PATENT DOCUMENTS

| JP | 3724472 B2 | 12/2005 |
| JP | 4551474 B2 | 9/2010 |

(Continued)

OTHER PUBLICATIONS

JP-2015214192-A (English Translate), Dec. 3, 2015, 10 pp. (Year: 2015).*

*Primary Examiner* — Elias Desta
(74) *Attorney, Agent, or Firm* — Maier & Maier, PLLC

(57) ABSTRACT

A communication device of an embodiment includes a normal operation mode and a low-power consumption mode and includes a first memory unit, a second memory unit, and a control unit. The first memory unit includes a work area for execution of firmware configured to perform basic control of the communication device. The second memory unit stores software for communication with an external device. When transition is performed from the normal operation mode to the low-power consumption mode, the control unit stops voltage supply to the first memory unit and performs control to reduce voltage supplied to the second memory unit to lower than a voltage in the normal operation mode.

11 Claims, 5 Drawing Sheets

(51) Int. Cl.
  *G06F 1/3234*  (2019.01)
  *G06F 1/3287*  (2019.01)
  *G06F 1/3296*  (2019.01)
  *G06F 3/06*    (2006.01)

(52) U.S. Cl.
  CPC .......... *G06F 1/3296* (2013.01); *G06F 3/0625* (2013.01); *G06F 3/0634* (2013.01); *G06F 3/0679* (2013.01)

(58) Field of Classification Search
  CPC .... G06F 1/3278; G06F 1/3209; G06F 3/0625; G06F 3/0634; G06F 3/0679; Y02D 10/00
  See application file for complete search history.

(56) References Cited

FOREIGN PATENT DOCUMENTS

| | | | |
|---|---|---|---|
| JP | 2015214192 A | * | 12/2015 |
| JP | 6131215 B2 | | 5/2017 |

* cited by examiner

COMMUNICATION DEVICE AND TIRE PRESSURE MONITORING SYSTEM

CROSS-REFERENCE TO RELATED APPLICATIONS

This application is based upon and claims the benefit of priority from the prior Japanese Patent Application No. 2020-151559 filed on Sep. 9, 2020; the entire contents of which are incorporated herein by reference.

FIELD

Embodiments of the present invention relate to a communication device and a tire pressure monitoring system.

BACKGROUND

Recently, a tire pressure monitoring system (TPMS) configured to monitor air pressure of a tire and warn a driver when the air pressure of the tire has significantly decreased has been mounted on an automobile. The TPMS includes a tire communication device configured to measure the air pressure of each tire and perform wireless communication, and a control device configured to receive information of the air pressure from the tire communication devices and provide warning when the air pressure of the tire has significantly decreased.

In addition, recently. Bluetooth Low Energy (hereinafter abbreviated as BLE) that achieves power consumption lower than power consumption of conventional Bluetooth (registered trademark) has been standardized. The tire communication device has a small size since the tire communication device is attached to a tire, and a battery mounted on the tire communication device has a small capacity. Thus, low power consumption of the tire communication device has been desired. To achieve low power consumption, a BLE standard communication device is incorporated in the tire communication device.

The tire communication device performs wireless communication of information such as air pressure of a tire to the control device at a predetermined communication interval, for example, at a one-minute interval. To achieve low power consumption, the tire communication device transitions to a low-power consumption mode in a duration in which wireless communication is not performed, and returns to a normal operation mode only in a duration in which wireless communication is performed.

DETAILED DESCRIPTION

A communication device of an embodiment includes a normal operation mode and a low-power consumption mode and includes a first memory unit, a second memory unit, and a control unit. The first memory unit includes a work area for execution of a firmware configured to perform basic control of the communication device. The second memory unit stores software for communication with an external device. When transition is performed from a normal operation mode to a low-power consumption mode, the control unit stops supply voltage to the first memory unit and performs control to reduce voltage supplied to the second memory unit to lower than the voltage in the normal operation mode.

Embodiments will be described below in detail with reference to the accompanying drawings.

First Embodiment

Figure 1:
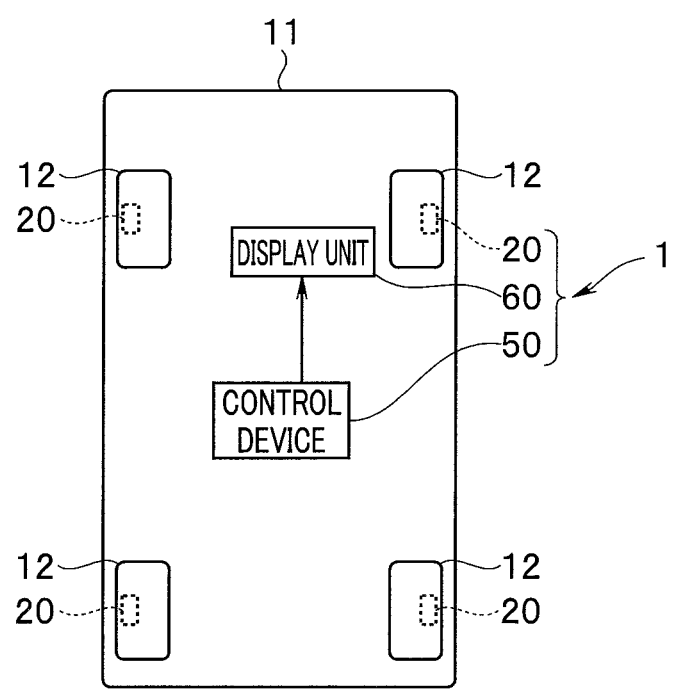
FIG. 1 is a diagram illustrating an exemplary configuration of a vehicle on which a tire pressure monitoring system of a first embodiment is mounted.

FIG. 1 is a diagram illustrating an exemplary configuration of a vehicle on which a tire pressure monitoring system of a first embodiment is mounted.

As illustrated in FIG. 1, the tire pressure monitoring system 1 includes four tire communication devices 20 attached to four vehicle wheels 12 of a vehicle 11, respectively, a control device 50 attached at a predetermined position on a vehicle body of the vehicle 11, and a display unit 60. Each vehicle wheel 12 includes a wheel and a tire.

Each of the tire communication devices 20 is attached to the corresponding wheel through a valve and disposed inside the corresponding tire. The tire communication device 20 includes a plurality of sensors configured to measure information related to the tire, such as a pressure sensor configured to measure air pressure in the tire. The tire communication device 20 transmits measurement results measured by various sensors, such as a measurement result of the air pressure in the tire, to the control device 50.

When an engine of the vehicle 11 is started, the control device 50 becomes able to receive the measurement results such as the air pressure of the tire from each tire communication device 20 through BLE communication. The tire communication device 20 transmits the measurement results such as the air pressure of the tire to the control device 50 at a predetermined time interval, for example, at a one-minute interval.

Having received the measurement results such as the air pressure of the tire from each tire communication device 20 at a predetermined time interval, the control device 50 determines whether the air pressure and temperature of the tire have anomaly based on the measurement results. When having determined that the air pressure and temperature of the tire have anomaly, the control device 50 notifies a driver of the tire anomaly by performing warning display on an instrument panel or the display unit 60 additionally installed.

Figure 2:
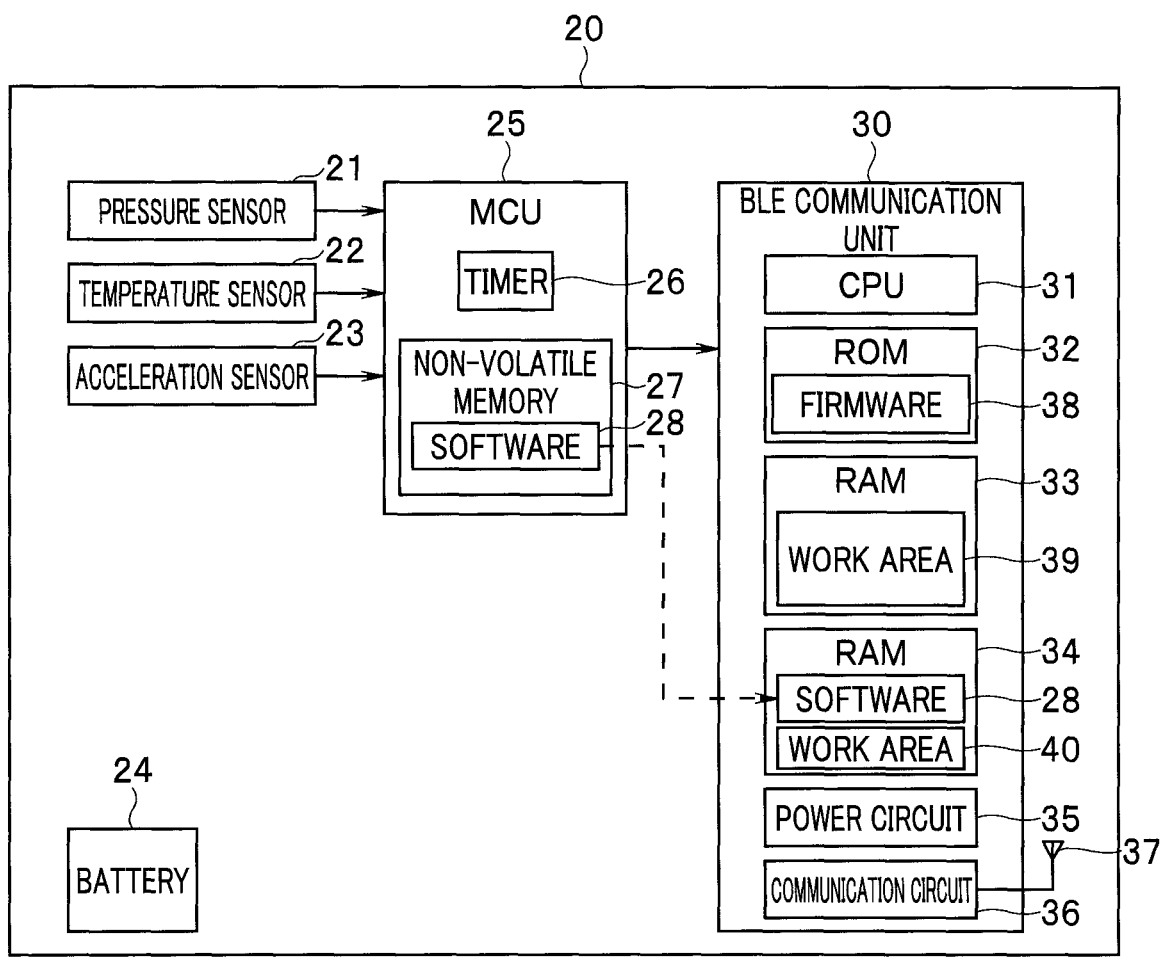
FIG. 2 is a diagram illustrating an exemplary configuration of a tire communication device of the first embodiment.

FIG. 2 is a diagram illustrating an exemplary configuration of each tire communication device of the first embodiment.

As illustrated in FIG. 2, each tire communication device 20 includes a pressure sensor 21, a temperature sensor 22, an acceleration sensor 23, a battery 24, a micro control unit (hereinafter referred to as MCU) 25, and a BLE communication unit 30.

The MCU 25 includes a timer 26 and a non-volatile memory 27. The BLE communication unit 30 is a communication device configured as a one-chip semiconductor device, for example, an integrated circuit (IC). The BLE communication unit 30 includes a CPU 31, a ROM 32, a first RAM 33, a second RAM 34, a power circuit 35, a communication circuit 36, and an antenna 37.

The pressure sensor 21 measures air pressure in the corresponding tire and outputs a result of the measurement to the MCU 25. The temperature sensor 22 measures temperature in the tire and outputs a result of the measurement to the MCU 25. The acceleration sensor 23 measures acceleration applied to the tire and outputs a result of the measurement to the MCU 25. Note that the tire communication device 20 may include another sensor in addition to the pressure sensor 21, the temperature sensor 22, and the acceleration sensor 23.

The battery 24 supplies power to the pressure sensor 21, the temperature sensor 22, the acceleration sensor 23, the MCU 25, and the BLE communication unit 30.

The non-volatile memory 27 is, for example, a flash memory or an electrically erasable programmable ROM (EEPROM). The non-volatile memory 27 stores software 28 developed by a company or the like that develops a product, such as the tire communication device 20 or the tire pressure monitoring system 1, on which the BLE communication unit 30 is mounted.

When power is supplied from the battery 24 to each circuit unit and the tire communication device 20 is activated, the MCU 25 reads the software 28 from the non-volatile memory 27 and outputs the software 28 to the BLE communication unit 30. The software 28 is software for performing, for example, BLE communication with the external control device 50 and stored in the second RAM 34.

The MCU 25 also acquires, at a predetermined time interval in accordance with a time measured by the timer 26, measurement values obtained by the pressure sensor 21, the temperature sensor 22, and the acceleration sensor 23 and outputs the measurement values to the BLE communication unit 30. The BLE communication unit 30 transmits, based on control by the MCU 25, the input measurement values to the control device 50 through BLE wireless communication. In addition, the BLE communication unit 30 periodically repeats the normal operation mode and the low-power consumption mode based on control by the MCU 25. Specifically, the normal operation mode corresponds to a duration in which the BLE communication unit 30 transmits each measurement result to the control device 50 through wireless communication, and the low-power consumption mode corresponds to a duration other than the duration in which each measurement result is transmitted to the control device 50 through wireless communication.

The CPU 31 as the control unit performs entire control of the BLE communication unit 30. The ROM 32 configured as a third memory unit stores software (hereinafter referred to as firmware) 38 for performing basic control of the BLE communication unit 30. The first RAM 33 configured as the first memory unit includes a work area 39 for execution of the firmware 38 stored in the ROM 32 by the CPU 31. The CPU 31 receives a signal from the MCU 25 and switches an operation state of the BLE communication unit 30 to one of the normal operation mode and the low-power consumption mode.

The second RAM 34 configured as the second memory unit stores the software 28 read from the non-volatile memory 27 by the MCU 25. The second RAM 34 includes a work area 40 for execution of the software 28 by the CPU 31.

The power circuit 35 supplies, to each circuit unit in accordance with control by the CPU 31, power supplied from the battery 24. When transition is performed from the normal operation mode to the low-power consumption mode, the power circuit 35 stops, in accordance with control by the CPU 31, voltage supply to the first RAM 33 and reduces voltage supplied to the second RAM 34 to lower than the voltage in the normal operation mode.

The communication circuit 36 performs BLE wireless communication with the control device 50. The communication circuit 36 generates an advertising packet including measurement results input from the MCU 25 and transmits the advertising packet to the control device 50 through the antenna 37.

Figure 3:
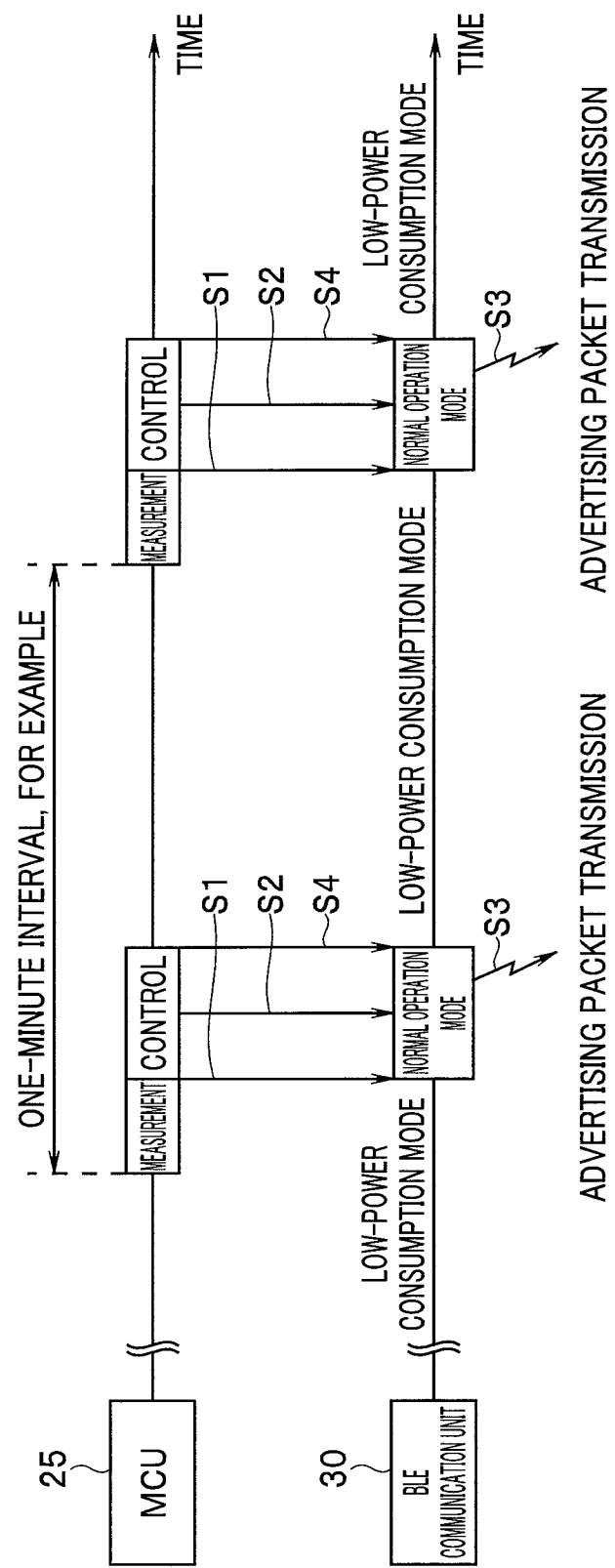
FIG. 3 is a diagram illustrating exemplary operation of an MCU and a BLE communication unit.

FIG. 3 is a diagram illustrating exemplary operation of the MCU and the BLE communication unit.

The MCU 25 acquires measurement values from the pressure sensor 21, the temperature sensor 22, and the acceleration sensor 23, for example, at a one-minute interval. Having acquired the measurement values, the MCU 25 controls the BLE communication unit 30 to transmit the measurement values to the control device 50.

The BLE communication unit 30 is in the low-power consumption mode in a duration other than a duration in which the measurement values are transmitted to the control device 50. Thus, the MCU 25 outputs, to the BLE communication unit 30, an activation signal for causing the BLE communication unit 30 to transition (return) from the low-power consumption mode to the normal operation mode (S1). Having received the activation signal from the MCU 25, the BLE communication unit 30 transitions from the low-power consumption mode to the normal operation mode. The BLE communication unit 30 transitions from the low-power consumption mode to the normal operation mode based on the activation signal periodically input from outside.

In addition to outputting of the measurement values acquired from the pressure sensor 21, the temperature sensor 22, and the acceleration sensor 23 to the BLE communication unit 30, the MCU 25 outputs, to the BLE communication unit 30, a transmission start signal for starting advertising packet transmission (S2). Having received the transmission start signal from the MCU 25, the BLE communication unit 30 generates an advertising packet including the measurement values and transmits the advertising packet to the control device 50 (S3).

Subsequently, the MCU 25 outputs, to the BLE communication unit 30, a transmission stop signal for stopping the advertising packet transmission (S4). Having received the transmission stop signal from the MCU 25, the BLE communication unit 30 stops the advertising packet transmission and transitions from the normal operation mode to the low-power consumption mode.

The low-power consumption mode will be described below in more detail. Typically, the low-power consumption mode includes Sleep mode in which voltage supplied to a RAM is reduced to lower than the voltage in the normal operation mode, and Deep sleep mode in which voltage supply to the RAM is stopped.

In Sleep mode, data is continuously held in the RAM, and thus, no software load processing nor firmware activation processing is necessary at transition from the low-power consumption mode to the normal operation mode. Thus, in Sleep mode, a time period taken for transition from the low-power consumption mode to the normal operation mode is short, and power consumption at transition from the low-power consumption mode to the normal operation mode is small. However, in Sleep mode, leakage current continuously flows through the RAM in the low-power consumption mode, and thus power consumption is large irrespective of a communication interval.

In Deep sleep mode, leakage current does not flow through the RAM in the low-power consumption mode, but data held in the RAM is lost, and accordingly, software load processing and firmware activation processing are needed at transition from the low-power consumption mode to the normal operation mode. Thus, in Deep sleep mode, the time period taken for transition from the low-power consumption mode to the normal operation mode is long, and the power consumption at transition from the low-power consumption mode to the normal operation mode is large. As a result, in Deep sleep mode, an effect of power consumption reduction is large when the communication interval is long, but is small when the communication interval is short.

The BLE communication unit 30 of the present embodiment includes the first RAM 33 including the work area 39 for execution of the firmware 38 by the CPU 31, and the second RAM 34 onto which the software 28 is loaded and that includes the work area 40 for execution of the software 28 by the CPU 31. In the low-power consumption mode of the present embodiment, the power circuit 35 stops, based on control by the CPU 31, voltage supply to the first RAM 33 and reduces voltage supplied to the second RAM 34 to lower than the voltage in the normal operation mode. In this manner, the BLE communication unit 30 of the present embodiment includes the first RAM 33 and the second RAM 34 and applies Deep sleep mode to the first RAM 33 and Sleep mode to the second RAM.

Figure 4:
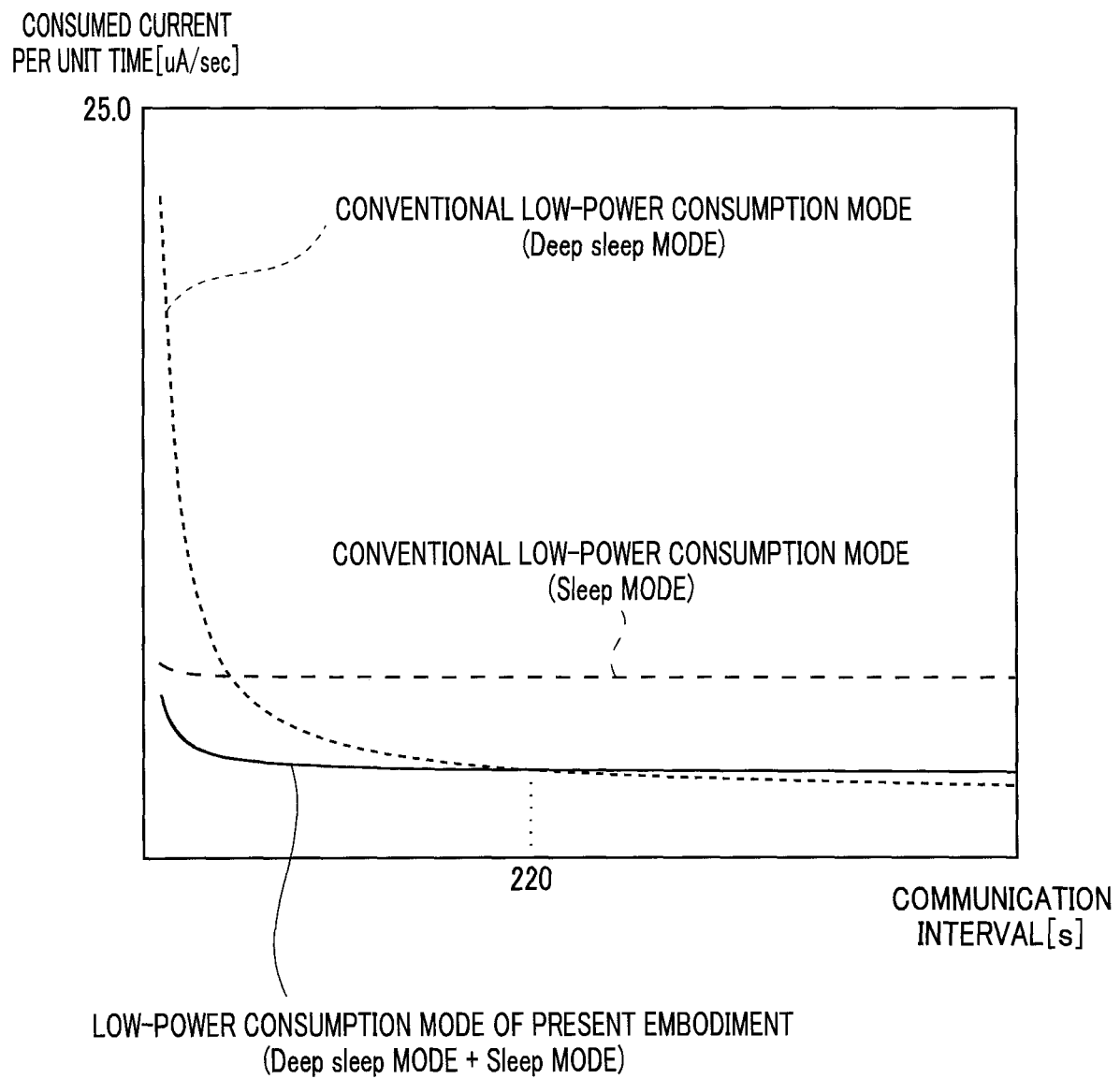
FIG. 4 is a diagram illustrating a relation between consumed current per unit time and a communication interval in a conventional low-power consumption mode and a low-power consumption mode of the present embodiment.

FIG. 4 is a diagram illustrating a relation between consumed current per unit time and the communication interval in a conventional low-power consumption mode and the low-power consumption mode of the present embodiment.

In Sleep mode, voltage supplied to the RAM is reduced to lower than the voltage in the normal operation mode. Data in the RAM is held since voltage is supplied to the RAM. Thus, in Sleep mode, no software load processing nor the like is necessary at transition from the low-power consumption mode to the normal operation mode, but voltage is supplied to the RAM, and thus leakage current flows. As a result, in Sleep mode, the consumed current per unit time is not zero at a constant level irrespective of a length of the communication interval as illustrated in FIG. 4.

In Deep sleep mode, software load processing and the like are needed at each transition from the low-power consumption mode to the normal operation mode. In Deep sleep mode, voltage supply to the RAM is stopped and no leakage current flows. As a result, in Deep sleep mode, the consumed current per unit time is large when the communication interval is short, but is small when the communication interval is long as illustrated in FIG. 4.

In the low-power consumption mode of the present embodiment, voltage supply to the first RAM 33 is stopped. In addition, in the low-power consumption mode of the present embodiment, since loading of the software 28 is needed, voltage supplied to the second RAM 34, which needs a longer time period and larger electrical power at activation is lower than the voltage in the normal operation mode. Accordingly, leakage current does not flow through the first RAM 33 but flows only through the second RAM 34.

Leakage current is substantially proportional to a capacity of a RAM. Thus, for example, when the first RAM 33 has a capacity of 128 KB and the second RAM 34 has a capacity of 32 KB, leakage current flows only through the second RAM 34 and thus is ⅕ of leakage current in a case in which leakage current flows through the first RAM 33 and the second RAM 34.

Data held in the first RAM 33 is lost through transition from the normal operation mode to the low-power consumption mode. Specifically, data generated during execution of the firmware 38 and held in the work area 39 of the first RAM 33 is lost from the work area 39. Thus, when the BLE communication unit 30 switches to the normal operation mode, the CPU 31 needs to perform processing of activating the firmware 38 to restructure the data held in the first RAM 33.

When the BLE communication unit 30 operates in the normal operation mode, data generated during execution of the software 28 and the software 28 is held in the second RAM 34. The data held in the second RAM 34 is not lost through transition from the normal operation mode to the low-power consumption mode. Thus, at transition from the low-power consumption mode to the normal operation mode, the software 28 does not need to be loaded from the non-volatile memory 27 outside the BLE communication unit 30 onto the second RAM 34 inside the BLE communication unit 30. For example, when a time period taken for processing of activating the firmware 38 is substantially equal to a time period taken for processing of loading the software 28, the time period taken for transition from the low-power consumption mode to the normal operation mode is substantially halved. Accordingly, current consumed through transition from the normal operation mode to the low-power consumption mode is substantially halved.

As a result, as illustrated in FIG. 4, the low-power consumption mode in the BLE communication unit 30 of the present embodiment can reduce the consumed current to lower than the consumed current in the conventional low-power consumption mode (Sleep mode), and can reduce the consumed current to lower than the consumed current in the conventional low-power consumption mode (Deep sleep mode) when the communication interval is 220 [s] or shorter.

Thus, a large effect of reducing the consumed current is obtained when the BLE communication unit 30 of the present embodiment is used in the tire pressure monitoring system 1 that performs communication at a predetermined communication interval, for example, at a one-minute interval and periodically repeats the normal operation mode and the low-power consumption mode. Thus, with the BLE communication unit 30 as the communication device of the present embodiment, it is possible to reduce the consumed current in a communication device that performs communication at a predetermined time interval.

Second Embodiment

Subsequently, a second embodiment will be described below.

Figure 5:
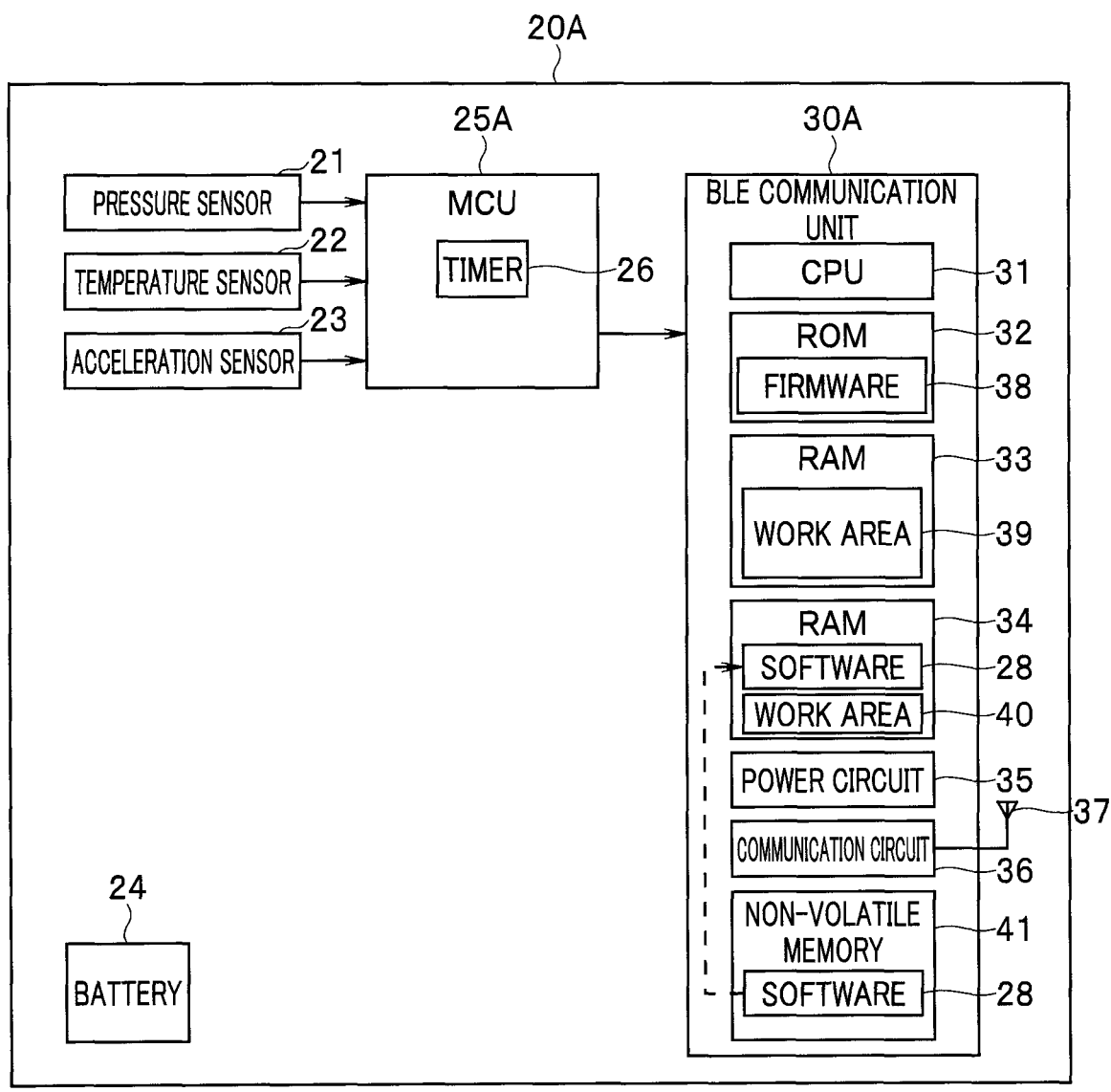
FIG. 5 is a diagram illustrating an exemplary configuration of a tire communication device of a second embodiment.

FIG. 5 is a diagram illustrating an exemplary configuration of a tire communication device of the second embodiment. Note that, in FIG. 5, a component same as a component in FIG. 2 is denoted by an identical reference sign, and description of the component is omitted.

As illustrated in FIG. 5, a tire communication device 20A of the second embodiment includes an MCU 25A and a BLE communication unit 30A in place of the MCU 25 and the BLE communication unit 30 in FIG. 2. The MCU 25A does not include the non-volatile memory 27 in the MCU 25.

The BLE communication unit 30A includes a non-volatile memory 41 added to the BLE communication unit 30. The BLE communication unit 30A is achieved by system in package (SiP) by which a plurality of semiconductor chips are sealed in one package. For example, in the BLE communication unit 30A, the non-volatile memory 41 as one semiconductor chip is stacked on the BLE communication unit 30 of the first embodiment as one semiconductor chip, and the semiconductor chips are sealed as one package.

The software 28 is stored in the non-volatile memory 41 as in the first embodiment. When the tire communication device 20A is activated, the software 28 is read and written to the second RAM 34 by the CPU 31. Note that the software 28 may be read and written to the second RAM 34 by the MCU 25A. Other configurations and operation are same as configurations and operation of the first embodiment.

Typically, the tire communication device 20A used in the tire pressure monitoring system 1 is attached to a tire of the vehicle 11. Since the tire has an extremely high temperature when the vehicle 11 travels fast under high temperature in mid-summer, any IC in the tire communication device 20A needs to ensure an operation temperature of 125° C. at maximum. However, it is not easy to operate a non-volatile memory at a temperature of 125° C. at maximum, and thus it has been conventionally needed to use an extremely high-cost non-volatile memory in a tire communication device.

The vehicle 11 is stationary when the tire communication device 20A is attached to the tire and initially turned on. After the tire communication device 20A is turned on, the software 28 is read from the non-volatile memory 41 and written to the second RAM 34.

Thereafter, the tire communication device 20A periodically repeats the normal operation mode and the low-power consumption mode as in the first embodiment, but the non-volatile memory 41 is accessed only at activation because voltage is continuously supplied to the second RAM 34. Specifically, since the non-volatile memory 41 is accessed only once when the vehicle 11 is stationary, the non-volatile memory 41 only needs to ensure an operation temperature of 85° C. at maximum. Accordingly, the non-volatile memory 41 can have a maximum operation temperature lower than a maximum operation temperature of the BLE communication unit 30A. As a result, the non-volatile memory 41 at low cost can be used, and thus the BLE communication unit 30A and the system using the BLE communication unit 30A can be achieved at low cost.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication device, the communication device including a normal operation mode and a low-power consumption mode, the communication device comprising:
   a first memory unit including a work area for execution of firmware configured to perform basic control of the communication device;
   a second memory unit configured to store software for communication with an external device; and
   a control unit configured to stop, when transition is performed from the normal operation mode to the low-power consumption mode, voltage supply to the first memory unit and perform control to reduce voltage supplied to the second memory unit to lower than voltage in the normal operation mode.

2. The communication device according to claim 1, wherein the software is read from an external non-volatile memory and written to the second memory unit.

3. The communication device according to claim 1, further comprising a power circuit configured to stop, when transition is performed from the normal operation mode to the low-power consumption mode, in accordance with control by the control unit, voltage supply to the first memory unit and reduce voltage supplied to the second memory unit to lower than the voltage in the normal operation mode.

4. The communication device according to claim 1, further comprising a transmission circuit configured to generate and transmit an advertising packet including measurement results measured by a plurality of sensors.

5. The communication device according to claim 4, wherein the plurality of sensors includes at least a pressure sensor, a temperature sensor, and an acceleration sensor.

6. The communication device according to claim 1, further comprising a non-volatile memory having a maximum operation temperature lower than a maximum operation temperature of the communication device, wherein the control unit reads the software from the non-volatile memory and writes the software to the second memory unit when the communication device is activated.

7. The communication device according to claim 1, further comprising a third memory unit configured to store the firmware.

8. The communication device according to claim 1, wherein the control unit transitions from the low-power consumption mode to the normal operation mode based on an activation signal periodically input from outside.

9. A tire pressure monitoring system comprising:
   a communication device including a normal operation mode and a low-power consumption mode, the communication device including a first memory unit, a second memory unit, and a control unit, the first memory unit including a work area for execution of firmware configured to perform basic control of the communication device, the second memory unit being configured to store software for communication with an external device, the control unit being configured to stop, when transition is performed from the normal operation mode to the low-power consumption mode, voltage supply to the first memory unit and perform control to reduce voltage supplied to the second memory unit to lower than voltage in the normal operation mode, the communication device being disposed inside a tire;
   a control device configured to receive an advertising packet transmitted at a predetermined interval from the communication device and including measurement results measured by a plurality of sensors, and determine whether the measurement results have anomaly; and
   a display unit configured to notify, when the control device determines that the measurement results have anomaly, a driver of the anomaly of the tire.

10. The tire pressure monitoring system according to claim 9, wherein the communication device includes at least a pressure sensor configured to measure air pressure in the tire, a temperature sensor configured to measure temperature in the tire, and an acceleration sensor configured to measure acceleration applied to the tire.

11. The tire pressure monitoring system according to claim 10, further comprising a transmission circuit configured to generate and transmit the advertising packet including measurement results measured by the pressure sensor, the temperature sensor, and the acceleration sensor.

* * * * *